US008752208B2

(12) United States Patent
Shulman et al.

(10) Patent No.: US 8,752,208 B2
(45) Date of Patent: *Jun. 10, 2014

(54) DETECTING WEB BROWSER BASED ATTACKS USING BROWSER DIGEST COMPUTE TESTS LAUNCHED FROM A REMOTE SOURCE

(75) Inventors: Amichai Shulman, Tel Aviv (IL); Tal Arieh Be'ery, Petach Tikva (IL)

(73) Assignee: Imperva Inc., Redwood Shores, CA (US)

(*) Notice: Subject to any disclaimer, the term of this patent is extended or adjusted under 35 U.S.C. 154(b) by 103 days.

This patent is subject to a terminal disclaimer.

(21) Appl. No.: 13/429,235

(22) Filed: Mar. 23, 2012

(65) Prior Publication Data
US 2012/0291129 A1    Nov. 15, 2012

Related U.S. Application Data

(60) Provisional application No. 61/486,192, filed on May 13, 2011.

(51) Int. Cl.
*H04L 9/32* (2006.01)

(52) U.S. Cl.
USPC ............... 726/30; 726/12; 713/153; 713/187

(58) Field of Classification Search
None
See application file for complete search history.

(56) References Cited

U.S. PATENT DOCUMENTS

| 8,079,080 | B2* | 12/2011 | Borders ........................... 726/22 |
| 2004/0098609 | A1 | 5/2004 | Bracewell et al. |
| 2004/0230831 | A1 | 11/2004 | Spelman et al. |
| 2007/0208822 | A1* | 9/2007 | Wang et al. .................... 709/217 |
| 2007/0234409 | A1 | 10/2007 | Eisen |
| 2008/0320567 | A1 | 12/2008 | Shulman et al. |
| 2009/0089574 | A1* | 4/2009 | Pryor et al. .................... 713/150 |
| 2009/0217386 | A1 | 8/2009 | Schneider |
| 2010/0017880 | A1* | 1/2010 | Masood .......................... 726/24 |
| 2011/0072262 | A1* | 3/2011 | Amir et al. ..................... 713/168 |
| 2011/0154459 | A1* | 6/2011 | Kuang et al. ...................... 726/6 |
| 2011/0265149 | A1* | 10/2011 | Ganesan ........................... 726/4 |
| 2011/0320816 | A1 | 12/2011 | Yao et al. |
| 2012/0042365 | A1* | 2/2012 | Shoval et al. ..................... 726/7 |
| 2012/0060036 | A1* | 3/2012 | Hamid et al. ................. 713/176 |
| 2012/0246725 | A1 | 9/2012 | Osipkov |
| 2013/0133086 | A1* | 5/2013 | Liberman et al. ............... 726/28 |
| 2013/0232547 | A1* | 9/2013 | Ganesan ........................... 726/3 |

OTHER PUBLICATIONS

Non-Final Office Action, U.S. Appl. No. 13/429,247, dated Nov. 20, 2013, 23 pages.
R. Fielding et al., "Hypertext Transfer Protocol—HTTP/1.1," Jun. 1999, 176 pages, Network Working Group, Request for Comments: 2616, The Internet Society.

* cited by examiner

*Primary Examiner* — Jeffery Williams
(74) *Attorney, Agent, or Firm* — Blakely Sokoloff Taylor & Zafman, LLP

(57) ABSTRACT

The detection of web browser-based attacks using browser tests launched from a remote source is described. In one example, a digest is computed based on the content of an HTTP response message. The message is modified and sent to a client device that also computes a digest. The digests are compared to determine whether content has been modified by malware on the HTTP client. The results of the test are analyzed and defensive measures are taken.

19 Claims, 8 Drawing Sheets

GET /url... HTTP/1.1          301
Host:someserver.com           302
User-Agent: ...               303
Accept-Encoding:gzip          304
(blank row)                   305
(some data)                   306

FIG. 3A

GET /url... HTTP/1.0          311
Host:someserver.com           312
User-Agent: ...               313
Pragma: No-Cache              314
Connection Close              315
(blank row)                   316
(some data)                   317

FIG. 3B

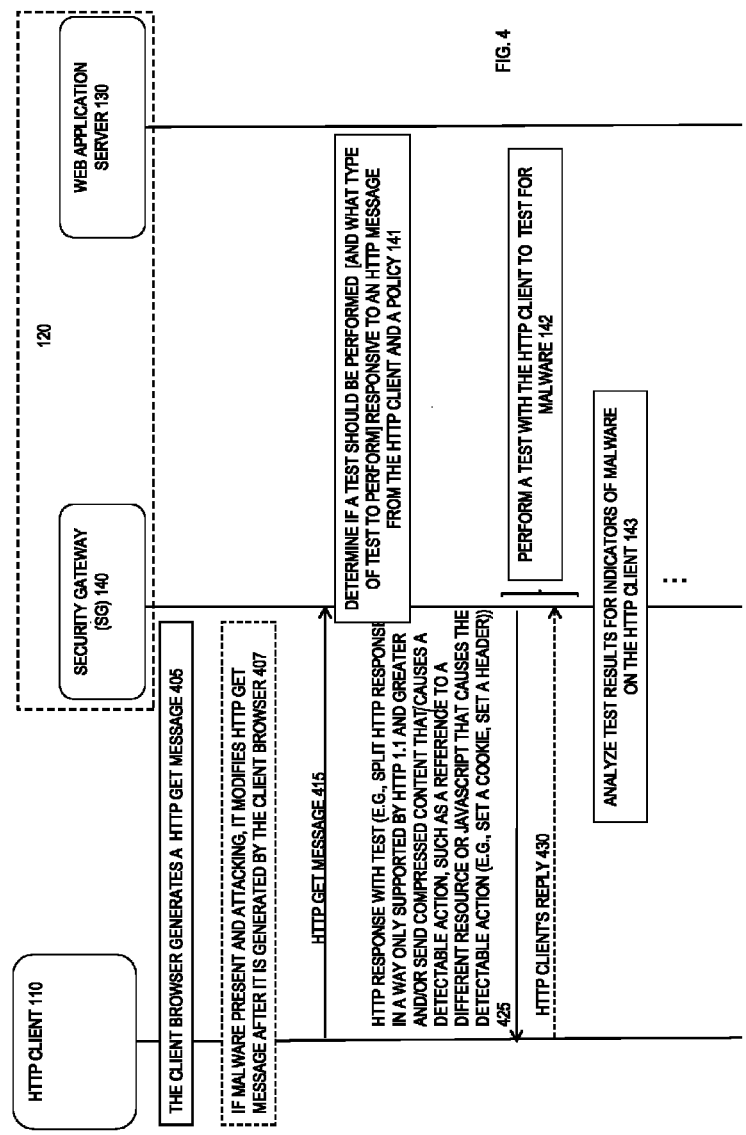

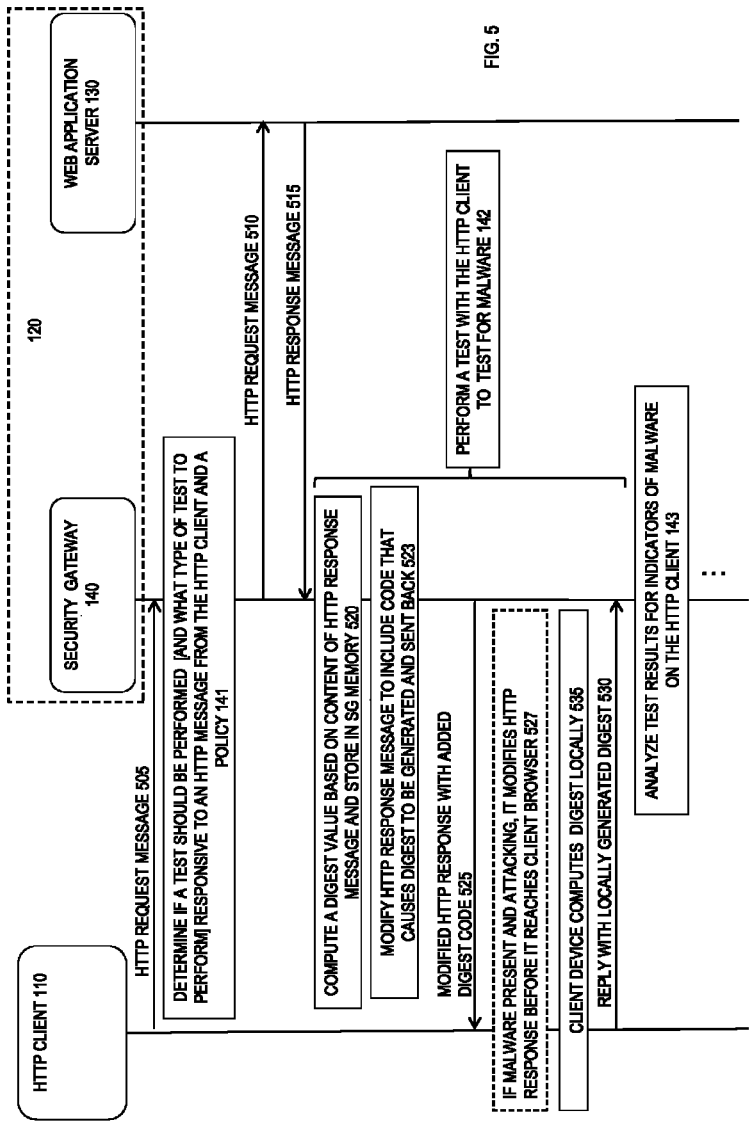

DETECTING WEB BROWSER BASED ATTACKS USING BROWSER DIGEST COMPUTE TESTS LAUNCHED FROM A REMOTE SOURCE

CROSS-REFERENCE TO RELATED APPLICATIONS

This application claims the priority of prior U.S. Provisional Patent Application Ser. No. 61/486,192, filed May 13, 2011, entitled DETECTING WEB BROWSER BASED ATTACKS USING BROWSER TESTS LAUNCHED FROM A REMOTE SOURCE.

FIELD

Embodiments of the invention relate to the field of computer network security; and more specifically, to deterring attacks supported by client web browsers.

BACKGROUND

A web application is a computer software application that is hosted in a web browser-controlled environment or coded in a web browser-supported language (such as JavaScript, combined with a browser-rendered markup language like Hyper Text Markup Language (HTML)) and reliant on a common web browser to render the application executable.

The Hypertext Transfer Protocol (HTTP) is a networking protocol that functions as a request-response protocol in the client-server computing model. In HTTP, a web browser, for example, acts as a client (referred to as an HTTP client running on a client device), while a web application running on a computer hosting a web site functions as a server (referred to as a web application server running on a server). The HTTP client submits an HTTP request message to the web application server. The web application server, which stores content, or provides resources, such as HTML files, or performs other functions on behalf of the HTTP client, returns a response message to the HTTP client. A response contains completion status information about the request and may contain any content requested by the HTTP client in its message body. HTTP Resources are identified and located on the network by Uniform Resource Identifiers (URIs)—or, more specifically, Uniform Resource Locators (URLs)—using the HTTP or HTTPS URI schemes. The original version of HTTP (HTTP/1.0) was revised in HTTP/1.1 (RFC 2616).

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Client end stations are client devices (e.g., server hardware, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) running an HTTP client (e.g., a web browser) access content/services provided over the Internet and/or content/services provided on virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, client end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Great effort has been made to protect servers and databases from outside security attacks and penetration. These efforts typically focus on watching traffic into and out of the server or database and in keeping the software and data of the server or database free from malware. These efforts have been successful enough that new methods of attack have been created that focus instead on user or client devices. A particularly difficult threat is one that appears to come from an authorized user. In some cases, the user's credentials have been surreptitiously acquired. In other cases, the user's client device and credentials have been appropriated. This can be done with or without the user's knowledge. One class of attacks uses an authorized user's client web browser and credentials in order to gain access to a web application server, and possibly a database through the web application server. This type of attack has been referred to as a man-in-the-browser attack.

From the perspective of the web application server, a man-in-the-browser (MitB) attack is particularly difficult to defend against because the browser is that of a legitimate user, with legitimate credentials, and possibly even legitimate hardware. While there are efforts to fight against such attacks at the client device, these efforts rely on the user of the client device, and may therefore be inconsistent or postponed. The user may not have enough incentive or resources to apply to this effort. In addition, there are typically many users but only one web application server so that it is more costly to provide protection at every user site.

In some attacks, including some of those referred to as man-in-the-browser attacks, malware is installed onto a client device that alters the behavior of a web interface. The web interface may be a web browser such as Internet Explorer™, Firefox™, Chrome™, or Safari™, however similar techniques may also be applied to other types of web interfaces including specific or custom applications that provide a portal to network resources. For a successful man-in-the-browser attack, the user's client device appears to the user to be operating properly. Many of the malware operations are intentionally concealed from the user. Typically, the malware alters the behavior of the web interface in order to obtain additional information from either the client device or a web application server with which the HTTP client communicates. In other cases, the malware will seek to install additional malware on the client device or the web application server.

In the present description, "malware" will be used to refer to any type of programming code that runs on an electronic device (e.g., a client device, a server, an appliance) and that seeks to use that hardware for some purpose other than what the user or operator of the hardware intends. Malware may be in the form of application software, Java code and other scripts, applets, servlets, or macros.

In the typical man-in-the-browser attack, installation code is launched and installs a malware kit. The malware kit adds new functionality to a web browser. The typical functions are to collect personal information or login credentials from the HTTP client or to use the HTTP client's credentials to collect information from a web application server after the HTTP client logs on to the web application server. The malware then sends the collected information to a third party for any of a variety of different undesired or nefarious uses. There are many other types of attacks, such as using the client device as an anonymous web client, using the client device to participate in a denial of service attack, using the client device to distribute worms or Trojan horses, etc. More kinds of attacks and uses for malware will doubtless be created over time.

BRIEF DESCRIPTION OF THE DRAWINGS

The invention may best be understood by referring to the following description and accompanying drawings that are used to illustrate embodiments of the invention. In the drawings:

FIGS. 3A and 3B illustrate contrasting user GET requests that may be generated by malware;

FIG. 4 illustrates an exemplary shape test according to one embodiment of the invention;

FIG. 5 illustrates an exemplary digest test according to another embodiment of the invention;

SUMMARY

The detection of web browser-based attacks using browser tests launched from a remote source is described. In one example, a digest is computed based on the content of an HTTP response message. The message is modified and sent to a client device that also computes a digest. The digests are compared to determine whether content has been modified by malware on the HTTP client. The results of the test are analyzed and defensive measures are taken.

DESCRIPTION OF EMBODIMENTS

The following description describes methods and apparatus for protecting network services from attack by malware at a client device. In the following description, numerous specific details such as implementations of operations and types and interrelationships of system components are set forth in order to provide a more thorough understanding of the present invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention.

Overview

Figure 1:
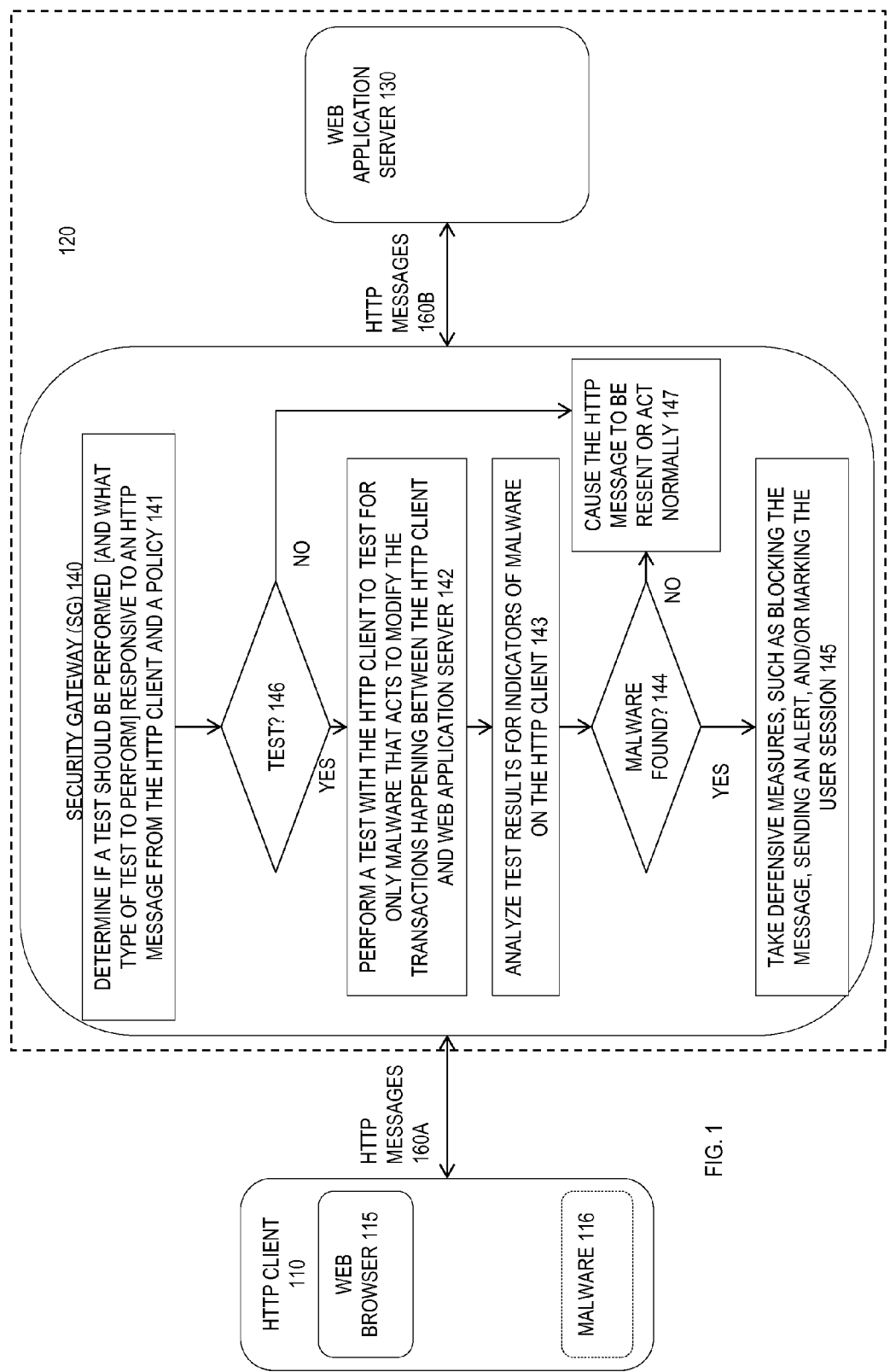
FIG. 1 illustrates a simple example of a network according to one embodiment of the invention.

FIG. 1 illustrates a simple example of a network according to one embodiment of the invention. In FIG. 1, an Hypertext Transfer Protocol (HTTP) client 110 executing on a client device seeks to communicate with a web application server 130 executing on server hardware. The web application server 130 is connected to the HTTP client 110 through a security gateway (SG) 140 that implements the operations shown to detect man-in-the-browser malware that changes the transaction; and may implement others (e.g., a web application firewall (WAF), an intrusion detection/prevention system). The security gateway receives HTTP messages 160A from the client and then, if they are accepted as secure, it passes the HTTP messages 160B through to the web application server. The particular connection may be direct and in-line as shown, or it may be a reverse and transparent proxy connection. Thus, the use of labels 160A and 160B are not intended to illustrate a particular type of deployment, but rather contemplate both: 1) a proxy implementation in which the client side messages 160A and the server side messages 160B are two separate entities; and 2) a network bridge implementation in which the client side messages 160A are relayed as 160B to the web application server 130 through the SG, and vice versa (but the SG may modify these HTTP messages or insert new HTTP messages into the communication stream between the HTTP client and the web application server as described herein).

In the illustrated example, the SG 140 and the web application server 130 are behind a firewall of an enterprise or media publishing system. Accordingly, in one embodiment, the HTTP client 110 can only communicate with the web application server 130 through the SG 140, although the SG 140 can communicate freely with the web application server 130. For simplicity and ease of understanding, the diagram of FIG. 1 shows a single HTTP client 110, a single SG 140 and a single web application server 130. However, there may be many more than those shown. The dashed box 120 surrounding the security gateway 140 and the web application server 130 signifies different possible levels of integration, including the following examples: 1) the security gateway 140 representing a separate application running on separate hardware (e.g., an appliance or network element) from the web application server 130; 2) the security gateway 140 representing a separate application running in a separate virtual machine from the web application server 130, but both virtual machines are being executed on the same server hardware; and 3) the security gateway 140 representing a software module that is part of the web application server 130 (and thus is part of the same application running on the same hardware—and if virtual machines are used, running in the same virtual machine).

The HTTP client 110 includes a web browser 115 to communicate with the web application server 130; although other approaches to communication may be used instead, depending on the particular implementation. In addition, while the client is shown as communicating only with the SG, the client may communicate with other devices through the same HTTP port or through additional and different communication ports and devices. Through any one or more of these other communications, the HTTP client 110 may become infected with malware 116 (such as man-in-the-browser malware) that affects the operation of the web browser 115. A typical MitB malware introduces changes to the communications between the HTTP client device 110 and the target web application server 130, such as modifications to messages between the HTTP client device 110 and the connected web application server 130. Specifically, the HTTP client 100 and the web application server 130 are sending content to each other using HTTP messages, and this content that is intended to be communicated between them may be modified (additions may be made, deletions may be made, replacements may be made) by MitB malware. As such, the HTTP client 110 and the web application server 130 may be impacted by the malware and the SG is placed between the two in order to prevent that impact.

In the illustrated example, at 141, the SG 140 determines if a test should be performed [and what type of test to perform] responsive to an HTTP message from the HTTP client and a policy. From block 141, control passes to block 146. In block 146, if it is determined that a test should be performed, then control passes to block 142; otherwise, control passes to block 147.

At 142, the SG performs a test with the HTTP client to test whether malware really is present in the client device, and particularly, affecting the transaction being performed. At 143, a result is received from the HTTP client and the SG analyzes the result to make a determination as to whether the client is infected. There may be more than one cycle of testing. Alternatively, the SG may be able to immediately determine whether the client is infected. A variety of different tests can be used at block 142, as described in more detail below.

In one embodiment of the invention, the test is performed with the client device to test for only malware that acts to modify the transactions happening between the HTTP client and web application server. In other words, the test is to determine only whether content intended to be communicated between the HTTP client and the web application server using an HTTP message has been modified by malware on the HTTP client. Thus, the test checks for only malware that modifies the content of a current and usual transaction between the HTTP client and the web application server, and not a plurality of tests employed irrespective of such content and designed to test for all types of malware irrespective of whether that malware impacts the current transaction. As such, the test ignores malware that is not applicable to the transaction (the content that the HTTP client and the web application server intended to communicate to each other). In other words, if any malware is present that does not interfere with the transaction, than the test will allow the transaction to be performed. That is, the test indicates the presence of malware only when malware impacts the transaction between the HTTP client and the web application server. This is advantageous because the transaction can be performed in those cases where malware is present on the HTTP client, but that malware does not interfere with the transaction; as opposed to preventing the transaction because the HTTP client is infected with malware that has nothing to do with the transaction currently being performed.

At 144 if it is believed that malware is executing on the HTTP client and affecting the current transaction being performed by the web browser then, at 145, the SG can take any of a variety of different defensive or offensive measures. These measures may include blocking the current HTTP request from reaching the web application server, blocking further HTTP requests, displaying a warning message to the HTTP client (i.e., sending an HTTP response that causes the displaying of a web page on the client device for the user to see), sending an alert to an administrator of the client device so that the client device can be cleaned or repaired, and sending an alert to an administrator of the SG. Another measure may be to add the client to a blacklist of suspicious clients. In addition, at 145, the SG can make an internal or external annotation with respect to the specific session, such as marking it as compromised, and invoke other or additional actions. The SG may also alert other SGs within the firewall or in other locations about the HTTP client. If no malware is detected, control passes from block 144 to block 147.

At 147, the SG causes the HTTP message to be resent or the SG acts normally. In the former case, the SG sends an HTTP message (e.g., a JavaScript reload command) to the HTTP client to cause the HTTP client to resend the original HTTP request that triggered block 141. As described later herein, this is useful where the test prevents or makes difficult the relaying of the original HTTP request to the web application server. In the latter case where the SG acts normally, the original HTTP message from the HTTP client may be passed through to the web application server. Similarly, an HTTP response from the web application server can also be passed to the HTTP client. On the other hand, if the client is infected by malware that is impacting the transaction, then the SG can block not only the original HTTP request (as well as future) from the HTTP client, but also any HTTP response from the web application server, including any session or security initiation. (This can be used to prevent unauthorized information from being received from the web application server responsive to an earlier HTTP request that appeared to be safe.)

The normal traffic of block 147 may be due to an initial determination at 146 that no test is needed or it may be due to negative results from tests being performed. As indicated, the operation may be to act normally and allow traffic to pass without interruption, or it may be to cause a given HTTP message to be resent. The best mode of sending traffic will depend on how the HTTP messages have been handled at security gateway and the particular configuration of the SG.

While different embodiments of the invention may respond to different triggers (block 141) and may support one or more different tests (142), two exemplary types of test will be described. The first example is referred to as a shape test. In the shape test, the SG analyzes incoming HTTP messages 160A from the HTTP client 110 (block 141) to find indicators of malware (e.g., see FIG. 3A-B). If such indicators are found, then a test is performed to test the functionality of the web browser (see FIG. 4). The second example is referred to as a digest test. In the digest test, the SG may determine, based on a policy, that a given HTTP message triggers the digest test. The digest test is intended to determine if malware has modified an HTTP transaction, such as the example modification shown in FIGS. 2A-B. In one embodiment, the digest test is performed as illustrated in FIG. 5. As described later herein, a digest of HTML content in an HTTP response being sent from the web application server to the HTTP client is created. The creation of the digest may include some randomness. JavaScript code is then introduced into the HTTP response that causes the HTTP client to compute a digest (in the same way) of the HTML content as it appears in the browser. The two digests can then be compared (either on the client side or the server side) to determine whether the HTML content has been tampered with by malware on the HTTP client device.

Exemplary Malware Modification Detectable by the Digest Test

Figure 2B:
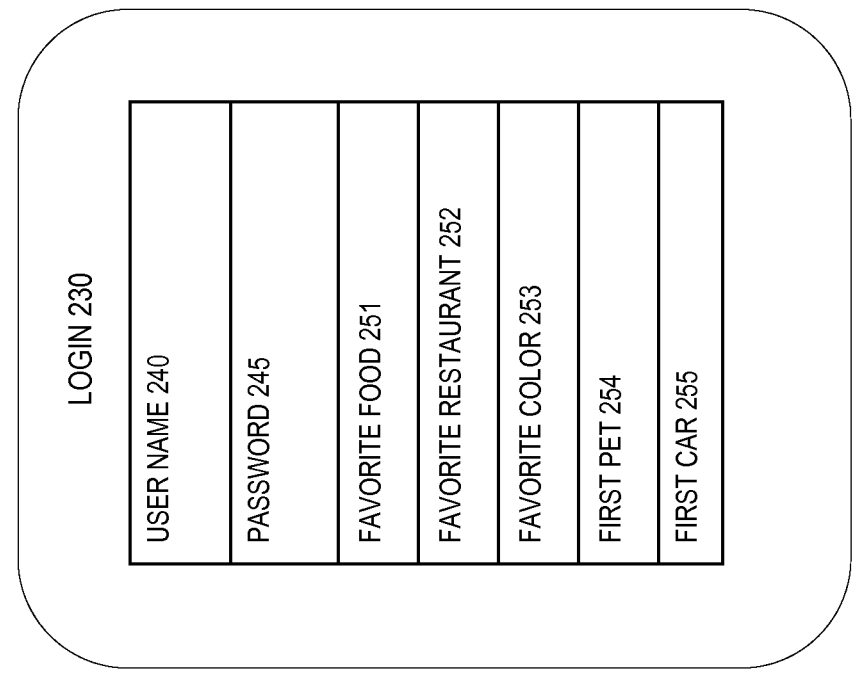
FIGS. 2A and 2B illustrate contrasting user login screens that may be generated by malware.
Figure 2A:
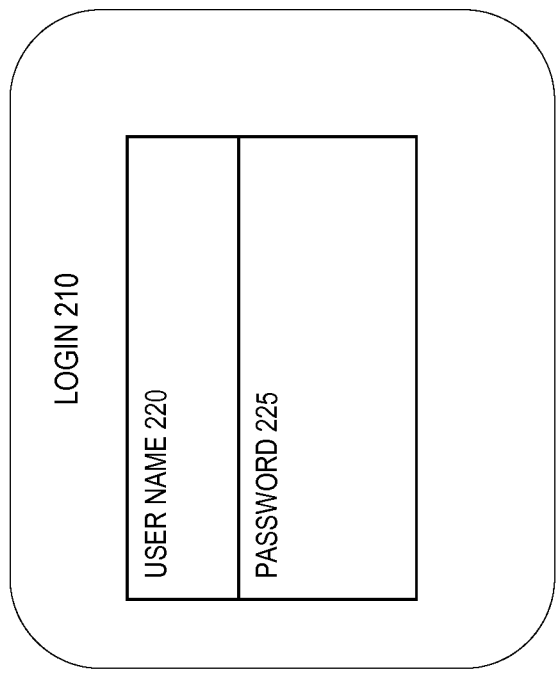

FIGS. 2A and 2B show an example of an attack driven by malware in a client device. In FIG. 2A, a conventional web browser login screen 210 is shown with a box for a user name 220 and a password. In FIG. 2B, the login screen has been altered by malware in the client device to include more fields. In this example, in addition to user name 240 and password 245, the fields request the answers to security questions, such as, favorite food 251, favorite restaurant 252, favorite color 253, first pet 254 and first car 255. More aggressive approaches may also be taken or a sequence of login questions may be asked that include still more fields, such as name of high school, city of birth, date of birth, marital status, and mother's maiden name. These fields are sometimes used as high security test questions for other databases. A bolder attack may directly ask for more useful information such as credit card numbers, bank account numbers, social security numbers, etc.

The information innocently provided by a user in these fields can be used by an attacker to link the user's user name and password for this web application server with the user's login credentials for other web application servers. Matching algorithms can be used to connect information from disparate sources so that the attacker can guess at credentials for other web application servers. The malware will send the information to the attacker for nefarious use. Typically, the malware in the client device will also send the information to the web application server intended by the user so that the user can log in to the web application server as intended. In this example, the request sent to the web application server has been changed from what is shown in FIG. 2A to FIG. 2B.

In the example of FIG. 2B, the web application server will receive from the HTTP client a log in an HTTP request which includes the additional data. The receiving web application server is typically programmed to look for the data it needs for login. It will typically ignore the other data as if it is a transmission error, or simply as unparseable. In other words, unable to recognize or parse the data, the web application server may ignore it. A security device, however, such as a SG, can use a digest test, for example, to identify the additional data as an indicator of malware and then take steps to confirm and resolve the problem.

Exemplary Malware Modification Detectable by the Shape Test

FIGS. 3A and 3B show another example of a different way in which malware may change an HTTP request sent to a web application server by an infected web browser. In the example of FIG. 3A, a normal HTTP request message is shown. This message is shown as an example of a typical series of lines that might be included in an HTTP request sent to a web application server. In FIG. 3B, malware has modified the series of fields in the message from those of FIG. 3A. The first line 301, "GET/url . . . HTTP/1.1" includes a method, GET, a named resource, url . . . , and a protocol version, HTTP/1.1. The malware version of this line 311 in FIG. 3B has the same values but requests protocol version HTTP/1.0. Switching to the earlier version of the protocol allows the malware to avoid all the complexities of supporting version 1.1. Version 1.0 also is easier to control by malware.

The next line 302 provides a field header, Host, and names a particular web application server, here indicated generally as "someserver.com." The malware may use the same line 312 or a different line. The next line 303 has the header "User-Agent" and names a particular user agent. The malware may use the same line (313). The fourth line 304 has the header "Accept-Encoding" and provides a tag for a compression encoding scheme that it will accept as gzip. Encoding and compression make it more difficult to intercept and capture data, so in this example, the malware has removed this field. Also, the malware has inserted a line 314 with a command "Pragma: No Cache." This command removes any cached data from this transaction. Using this command prevents prior cached data from affecting the transaction. For malware which is not acting consistent with a prior transaction, removing the cache helps to ensure that the malware transactions will operate as intended.

The next row 305, 316 is blank, followed 306, 317 by the transfer of some data. The malware however adds a line 315 to the HTTP request with a command of "Connection Close." Closing the connection is an HTTP version 1.1 command that avoids multiple requests from being serviced in a single transaction. The malware may include such a command again to avoid the complexities of handling true HTTP 1.1 connections. The browser will then open a new connection for the remaining or later requests that relate to servicing the user, rather than to servicing the attacker.

FIG. 3B shows examples of common modifications that might be made to a request by malware. These are provided only as examples and any one malware version may use any one or more of the described modifications or different modifications. Different attacks will use different modifications, however, in many actual scenarios, now and in the future, the malware will modify the interaction between the client device and the web application server.

Thus, a request to use an older protocol, such as 1.0, or to avoid encoding or compression, such as gzip, or to close a connection for no particular reason, and more, can all be used as indicators of malware. Each indicator can be checked to confirm the presence of malware and the request can be rejected. In some cases, the source of the request can be identified and appropriate action taken against the client device or its attacker.

The deception of the malware comes in part in that the HTTP request shown in FIG. 3B may be appropriate. As an example, some web browsers may be able to support only HTTP version 1.0 or earlier. Microsoft Internet Explorer 5.5 from circa 2000 and earlier, for example cannot use version 1.1. Other specialized browsers may also be so limited. Having received a request to use HTTP/1.0, an SG can test the web browser to determine if the request is legitimate or likely from malware.

There are a variety of different ways to send a test to the web browser to determine its abilities. In one example, the web application server's response can be constructed so that it can only be understood under HTTP/1.1. The reaction by the HTTP client then indicates whether the browser was able to read and interpret the HTTP/1.1 portions of the request. If it was, then the request for HTTP/1.0 is not legitimate.

As another example, the web application server can send an HTTP response message that includes HTTP 100 CONTINUE followed by HTTP 200 OK. HTTP 100 CONTINUE is a status code, used for large messages, indicating that the web browser should send the body of its request. The web browser should respond by continuing with the body of its request. HTTP 200 OK is a standard response for a successful data receipt. Since HTTP 100 is not supported in HTTP/1.0, if the browser correctly replies to this sequence of commands, then it is not a HTTP/1.0 browser. There are many other commands that can be used to test the capabilities or version number of a web browser instead of, or in addition to, those mentioned herein.

In another example, the web application server or a SG replies to a potential malware request with a response that includes compressed information (gzip), which if decompressed by the web browser causes the web browser to perform an action detectable by the SG. If the potential malware request being responded to did not include the statement 304 (ability to accept gzip), but HTTP client performs the detectable action, it means that the web browser does support gzip and malware has edited the HTTP request. Additional or different tests or requests may be used instead of, or in addition to, those described herein.

Exemplary Implementation of the Shape Test

FIG. 4 shows messages that may be exchanged between the system devices for the operations described above. These messages may constitute or be part of a session between a HTTP client and a web application server or the messages may be exchanged without establishing a formal session. In FIG. 4, at block 405, the HTTP client 110 generates an HTTP GET message or some other type of request message. At block 407, if malware is present and active on the client device, then the malware will modify the HTTP GET message after the message is generated by the web browser of the HTTP client 110. If the malware is not currently making an attack, then the message will continue unaltered.

At 415, the HTTP GET message or other type of request is sent from the HTTP client 110 for delivery to the web application server 130. However, its path is interrupted by the SG 140. In one embodiment, the SG analyzes the message at block 141 to see if a test should be performed against the client device. A test is appropriate when there are indicators in the message that the message has been modified by malware or if the client request is suspicious in some other way (e.g., See FIG. 3B).

In block 142, the SG performs a test with the HTTP client. In the example of FIG. 4, this test includes two messages—HTTP response 425 and HTTP client's request 430 in reply to the response.

Specifically, the SG sends the HTTP response 425 back to the HTTP client that includes a test. For example, the SG may send an HTTP response that is split in a way that is not supported by early versions of HTTP, such as 1.0 and earlier. This is a useful test if, for example, the HTTP client has requested the use of an early version of HTTP. If the client can properly interpret the HTTP response, then the client web browser is HTTP 1.1 compliant and the request to use HTTP 1.0 has probably been inserted by malware. Accordingly, if the client device reacts, then malware is probably present. If the client device does not react, then it was probably unable to interpret the split HTTP response and is not HTTP 1.1 compliant, so the request to use HTTP 1.0 was genuine and malware is likely not present. In FIG. 4, the HTTP client's reply 430 is shown in dotted line and may or may not occur, depending on the outcome of the test. The HTTP client's reply 430 may take a variety of different forms—e.g., an AJAX background request which can be handled by the SG independently of the web application server.

In another example, the SG sends compressed content in the HTTP response 425 that is intended to cause a detectable action, such as a reference to a specific test resource. If the client device has requested that compressed content not be used, yet the client device reacts to the compressed content by, for example, requesting the specific test resource, then the request not to use compressed content was probably inserted by malware. On the other hand, if the client web browser does not react to the request or does not request the specific test resource, then the request not to use compressed content is probably genuine and malware is not involved.

In each of these examples, the original HTTP request is analyzed to find an indicator that malware may be present on the client device. The test that is sent back to the client device may be specifically chosen based on the indicator that was found. For example, if the suspicious indicator is a request to use HTTP 1.0, then the test may be a test that requires HTTP 1.1 in order to be completed. If the client web browser successfully completes the test, then it has shown itself to be 1.1 compliant and the request to use 1.0 is therefore very suspicious. This can be taken as strong evidence that the request was inserted by malware. Similarly, the other tests also show whether the web browser is requesting features or configurations that it requires or instead the malware is inserting requests for features or configurations that serve the purposes of the malware but are not needed by the client web browser. In other words, the test checks the functionality of the web browser and makes sure it is consistent with the fields of the HTTP request 405.

After having formulated and performed a test on the browser at 142, the SG analyzes the reply at block 143. From this analysis, the SG determines further whether the client device is still suspicious. If it is, then the SG can take an appropriate action. In one example, it blocks access to the web application server 130 by the HTTP client device. On the other hand, if based on the received reply 430, the client appears to be legitimate, then the SG can allow access to the web application server. The original GET request message 415 (if it was buffered and any necessary modifications performed to account of the test that was performed) is passed to the web application server and the web application server can then formulate a response message that is passed back to the SG. Alternatively, the SG may request that the GET message be regenerated based on a reload response from the SG to the HTTP client; and the regenerated GET message is passed through to the web application server.

Thus, the shape test confirms the capabilities of the web browser when it is believed that malware may have modified an HTTP request to indicate that the web browser has less capability than it really has. Thus, the shape test checks for only malware that modifies an indication of the capabilities of the web browser, and not a plurality of tests employed irrespective of HTTP message content and designed to test for all types of malware. As such, the shape test ignores malware that has not modified an indication of the capabilities of the web browser.

Exemplary Implementation of the Digest Test

In another example malware is detected using digests. This approach takes advantage of a limitation of a man-in-the-browser type of attack. The malware in such an attack is not actually in the browser but running between the browser and the external communication layer. This is a benefit for the malware because data sent to the browser from the external communications layer can be intercepted and sent to an attacker location. The malware can also remove data that would reveal the existence of the malware before this data reaches the web browser. On the other hand, the malware does not know everything that the web browser knows.

In the example of FIG. 5, the HTTP client device 110 possibly infected with malware is interacting with the web application server 130 through the Security Gateway 140. As in FIG. 4, the illustrated messages may constitute a session or part of a session between the client device and the web application server or the transaction may be outside of an established session. The malware may only respond to certain HTTP messages with certain web application servers and certain web pages. Otherwise, the HTTP client device 110 operates normally. The HTTP client device 110 sends various HTTP requests, for example a GET message to the web application server 130, and these requests are observed by the SG. Responsive to such an HTTP request message, the SG analyzes a policy to determine, at 141, whether a test should be performed against the HTTP client device 110. If so then the SG forwards the HTTP request message 505 to the web application server 130 (as illustrated by HTTP request message 510) and waits for the corresponding HTTP response message 515. Responsive to receiving the HTTP response message 515, the HTTP client device runs the test at block 142. The exemplary digest test illustrated for block 142 includes elements 520, 523, 525, 527, 535, and 530.

In the illustrated example, at 520, the SG computes a digest of the web application server's response (515), such as a message digest, and stores the digest in a memory linked to an identification of the HTTP client device 110. The SG at 523 then modifies the HTTP response 515 from the web application server to include an instruction or code that, when processed by the web browser of the HTTP client, will cause that web browser to compute a digest in the same way. The modified HTTP response message 525 is sent from the SG to the HTTP client device 110 so that it will compute the same digest that the SG has already computed.

The HTTP response message may include JavaScript or some similar type code for computing the digest. In one embodiment, the digest instruction is an HTTP command to hash or apply a hashing function to the page or specified parts of the page. In another embodiment, the digest instruction is a JavaScript digest function that provides any necessary parameters for the computation.

The HTTP client device 110 at block 535 computes the digest as instructed and then sends a message 530 (which may be a subsequent HTTP request) with its own locally computed digest (which may be in a cookie) back to the SG. However, at block 527, if malware is present in the HTTP client device 110 and actively attacking, then it may have modified the HTTP response (525) before it reaches the client web browser. As a result, when the web browser computes the digest, the locally computed digest will be based on a modified HTTP response and will probably not match the digest that the SG computed based on the unmodified HTTP response 515.

Having received the locally computed digest from the HTTP client device (block 530), the SG in block 143 can compare the two to determine whether the HTTP client 110 has accurately computed the digest. If the two digest values do not match, then the SG may take any of the offensive or defensive measures mentioned above. It can even block a connection between the HTTP client device and the web application server. This blocking may include preventing messages from being passed between the two as well as notifying other web application servers and the HTTP client device. If the digests match, then normal communications can resume with the verified client device.

There are a variety of different ways to compute the digest. For example, the digest can be generated from the entire HTTP response message sent from the web application server as is, or it may be more specialized by specifying particular items to be included in the digest or by specifying a transformation over the original HTTP response before computing the digest (e.g. ignoring white space characters). In one embodiment, the digest is for a transformation, such that all white spaces are removed. In another embodiment, only specified HTML elements are digested, script elements, or input elements. Alternatively, operations might be combined, so for example, a portion of the page may be taken, white space removed and then the digest calculated. In another embodiment, the digest is generated from the page that includes the JavaScript for computing the digest (i.e., the modified HTTP response). In another embodiment, a previously sent page is designated for computing the digest. In another embodiment, the calculated digest is put into a cookie that is sent back to the SG and the current page is not reloaded. In addition, a random nonce may also be included.

Particular elements can be selected to be excluded from the digest. This allows legitimate client side scripts to be excluded from the process. On the other hand the elements selected to be included should include those elements that may be affected by the malware. If the digest at the client matches the digest at the server or the SG, then the malware is not active at least for the elements that were digested.

If the digests do not match, then the web application server can be notified (not shown). The results can be provided as information about the user's session. This information can later be used by a security policy or for a variety of other purposes. In addition, the session can be interrupted.

Thus, the digest test is added to a usual HTTP response from the web application server and it tests if the content of that usual HTTP response gets modified by malware on the HTTP client. Thus, the digest test checks for only malware that modifies the content of a current and usual transaction (HTTP response and resulting HTTP request) between the HTTP client and the web application server, and not a plurality of tests employed irrespective of such content and designed to test for all types of malware irrespective of whether that malware impacts the current transaction. As such, the digest test ignores malware that is not applicable to the transaction. In other words, if any malware is present that does not interfere with the transaction, than the digest test will allow the transaction to be performed. That is, the digest test indicates the presence of malware only when malware impacts the transaction between the HTTP client and the web application server. This is advantageous because the transaction can be performed in those cases where malware is present on the HTTP client, but that malware does not interfere with the transaction; as opposed to preventing the transaction because the HTTP client is infected with malware that has nothing to do with the transaction currently being performed.

Exemplary SG Flow that Includes Both the Shape and the Digest Test

Figure 6:
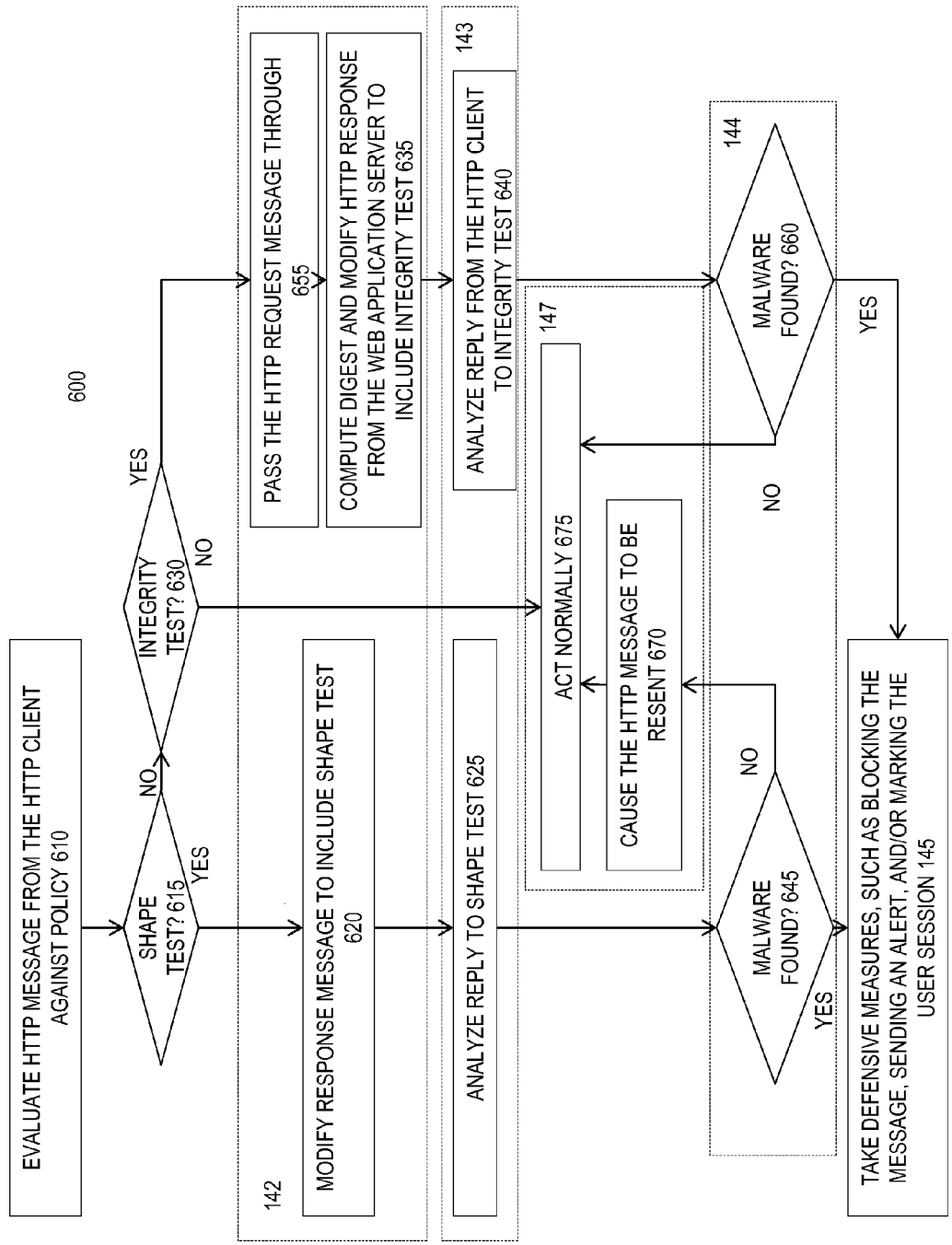
FIG. 6 is a flow diagram illustrating part of an exemplary cloud according to one embodiment of the invention.

FIG. 6 presents additional detail on some tests that may be performed to detect malware in an SG 600 configured in accordance with some embodiments. At block 610, a security gateway evaluates a message such as an HTTP GET message or another message, depending on the embodiment, against a policy. The policies can be stored on the security gateway or in another location. Based on the evaluation, the SG can determine at 615 whether to perform, for example, a shape test. If the SG determined that a shape test is not necessary, then the SG can consider whether an integrity test (e.g., the digest test) should be performed at 630. If the determinations are negative, the SG will cause the system to act normally at 675.

On the other hand, if a shape test is to be performed, then at 620, an HTTP response message is sent by the SG in a manner to perform a shape test. The HTTP client device will receive the HTTP response and formulate a reaction that is received by the SG. At 625, the HTTP response to the shape test is analyzed.

If at 645, malware is found, then defensive measures can be taken at 145 as described above, such as blocking the message, sending an alert to other web application servers, to the user, to a system administrator or others. The session can also be marked as compromised.

On the other hand if at 645, no malware is found, then the security gateway at 670 can cause the original HTTP request message to be resent. This allows the original intended communication between the HTTP client 110 and the web application server to proceed normally. The SG can then proceed to act normally at 675.

If an integrity test is determined to be appropriate, then at 655 the HTTP request message is passed through to the intended web application server. The response from the web application server is then modified at 635 in a manner to perform an integrity test. One such integrity test is the digest test. As mentioned above, the digest computation may be based on the entire server response or on any particular aspects of it, depending on the particular implementation. Also, the SG computes a digest in the same manner for comparison with the digest later computed by the client browser.

The HTTP client's web browser replies to the integrity test and at 640 this reply is compared to the expected reply. For a digest test, the digest computed by the HTTP client's web browser is compared to the digest previously computed by the SG. Based on the results of the integrity test at 660, a determination can be made as to whether the HTTP client device is likely to be infected by malware that is impacting the transaction between the HTTP client and the web application server. If malware is not found (it may be present on the client device, but not impacting the current transaction), then at 675, the system acts normally. However, if malware is found, then defensive measures can be taken at 145 as described above.

In the present discussion and in the drawings, results are discussed in terms of malware being found or not found. In the context of the present invention, malware may be found, or as in the example of FIG. 6, a result, operation, or effect common to malware is found. From the result, operation, or effect, the presence and operation of malware is inferred. However, no actual malware code has been observed or obtained. Nevertheless, in the present description, such an inference of malware is also referred to as a finding of malware.

Exemplary Cloud Implementation

Figure 7:
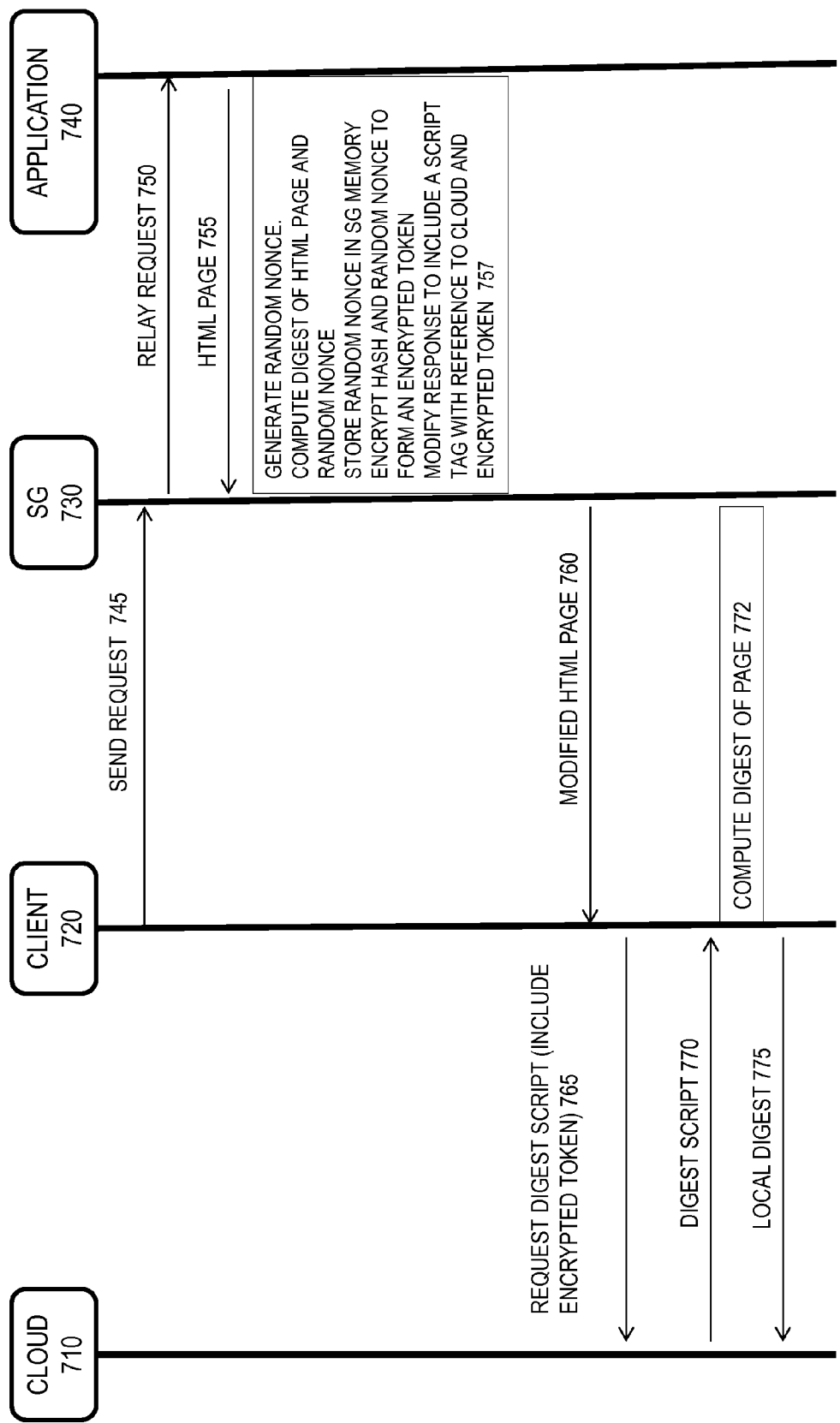
FIG. 7 illustrates a message exchange between nodes including digesting outbound HTML to detect malware according to an embodiment of the invention.
Figure 8:
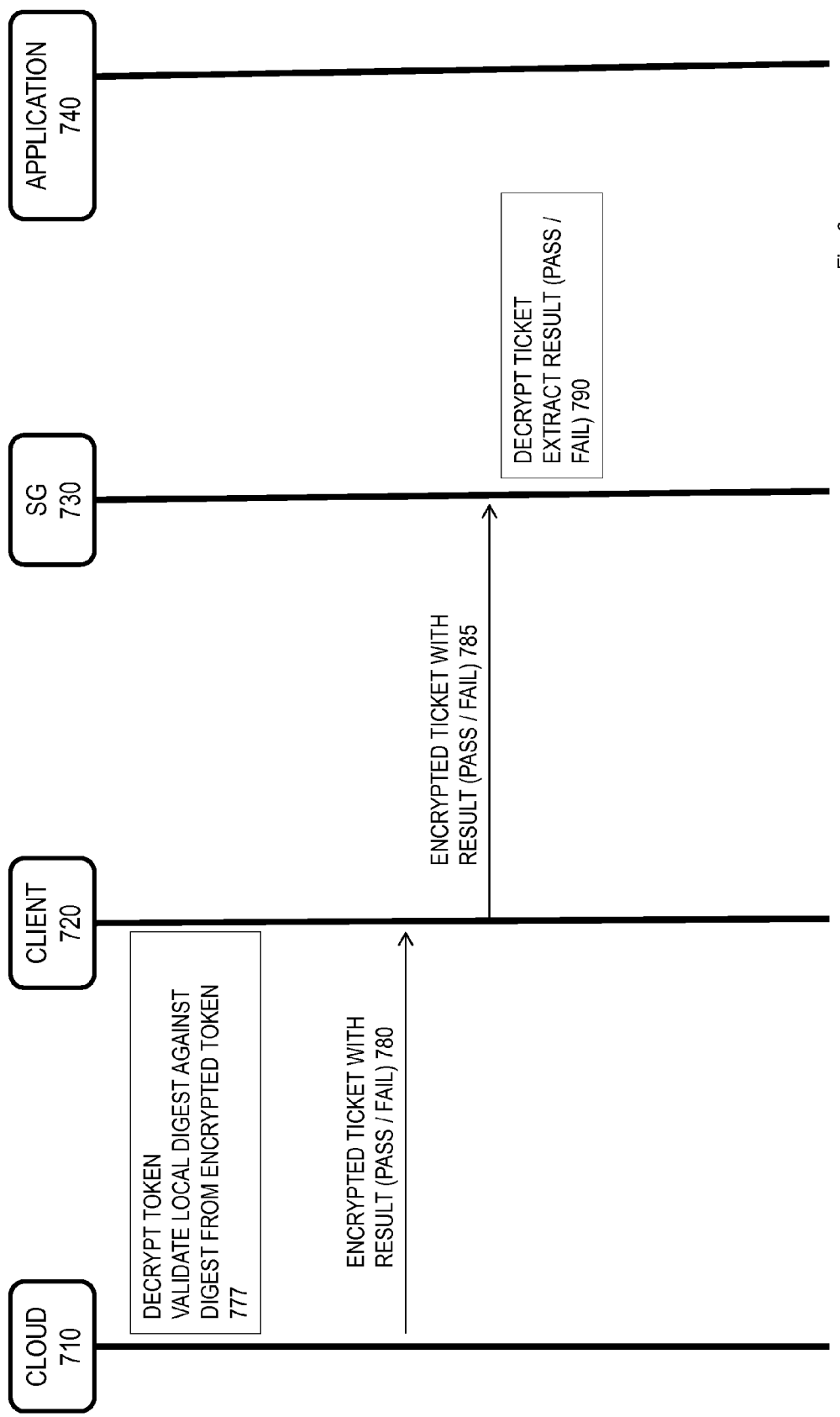
FIG. 8 illustrates additional messages exchanged following the messages of FIG. 7 according to the embodiment of FIG. 7.

Referring to FIG. 7, malware attacks, including man-in-the-browser type attacks, can be countered using the help of a Cloud deployment. In the example of FIGS. 7 and 8, the security gateway is assisted by another device or through a different connection to the security gateway, referred to as the Cloud. The Cloud represents a device or a connection to the security gateway that is accessible through the Cloud, that is, generally, the Internet or another wide area network infrastructure.

In FIG. 7, the client device 720 is coupled on one side to the Cloud 710 and on the other side to a security gateway 730. The connection to the security gateway may be through a firewall or also through the Cloud, with or without a firewall, virtual private connection or other security infrastructure. The gateway 730 is coupled to a web application server 740. In order to assist the security gateway (SG) in providing security, the Cloud has a connection with the SG. In one example the SG and the Cloud have a shared encryption key. In another embodiment, a token may be used. The token may be encrypted with a public key owned by the Cloud and then signed by the SG. Alternatively, the token may be encrypted with the SG's public key and signed by the Cloud device.

Turning to the communications shown in FIG. 7, the detection technique begins when an HTTP client 720 sends a request, for example an HTTP GET message, addressed to an web application 740. The HTTP session may be initiated by this message or the message may be part of an existing HTTP session. The SG intercepts or observes the message for evaluation and relays 750 the message to the intended web application. In reply, the web application server 740 generates an HTTP response, in this example an HTML page, and sends the page 755 back to the HTTP client 720. This is again intercepted by the SG.

Upon receiving the HTML page from the web application, the SG can perform a test with the HTTP client to ensure that the HTTP client is not executing an attack. This test may be generated and sent with or without the knowledge of the user. In the example of FIG. 7, the SG generates a random nonce and computes a digest or hash of the HTML page and the random nonce. The SG then encrypts the computed hash and the random nonce to form an encrypted token. The hash, the random nonce, and the token are all stored in local memory. The SG then modifies the HTML page from the web application server 740 to include a script tag that makes a reference to the Cloud and to the encrypted token. A similar test may be used in the examples of FIG. 5. Alternatively, the test of FIG. 5 may be applied to this example.

The modified HTML page 760 is sent to the HTTP client and the HTTP client in response to the script tag requests a verification packet from the Cloud. In this example, the request is for a digest script and is authenticated using the encrypted token received from the SG. Neither the HTTP client, nor the malware can decrypt or interpret the token without the key and the random nonce that the SG used to create them. The request is sent from the HTTP client to the Cloud based on the script tag that was included in the HTML page.

The Cloud then responds with the requested digest script at 770 which the HTTP client 720 can then use to compute the digest at 772 based on the HTML page that it received and has saved locally. If the HTML page has been altered by malware, then this digest will also be altered. The HTTP client then sends its locally computed digest to the Cloud at 775 where it is compared to the one computed by the SG.

To make the comparison, the Cloud device can use information not available to the HTTP client. The particular technique used to make the comparison will depend on how the SG made the calculation and on the information from the SG that has been made known to the Cloud. In the illustrated example, the Cloud device decrypts the token that was sent to it by the HTTP client at 765. In one example, the random nonce is used for randomizing the digest and not for encryption. The random nonce is made available to the HTTP client device in, for example, the HTML page 755 in clear text so that the HTTP client device can use it in the digest computation. Using the random nonce, the Cloud can then extract the digest and compare the digest from the token with the one received from the client. Alternatively, if the random nonce is used only for randomizing the digest, then the Cloud can compare the digest from the token with that from the client device without any decryption. Other techniques for communicating and comparing a digest from the web application server 740 with one from the client may be used, depending upon the particular circumstances. Based on the comparison, the Cloud can make a pass/fail determination for this integrity test. If the digest matches, then the HTTP client receives a pass; and if the HTTP client does not match, then the client receives a fail.

The Cloud can then generate a ticket with the pass/fail result, encrypt the ticket and send this to the HTTP client at 780. The HTTP client following the script tag, will send this to the SG at 785. The SG can then decrypt the ticket and extract the result. If the result is a fail, then as suggested by FIG. 6, defensive measures can be taken. If the result is a pass, then the SG passes messages through to the web application 740 or causes the original message to be resent from the HTTP client so that the communication can begin again.

In the described example, the SG and the Cloud share one or more encryption keys so that encrypted messages can be sent between them through the HTTP client. If the SG and the Cloud do not share an encryption key then, for the token and the encrypted ticket a public key and signature may be used. For example, both the token and ticket can be encrypted with a public key of either the SG or the Cloud and then signed rather than encrypted by the other.

In one example, to avoid a replay attack, a random test identifier may be used. The test identifier can be used to uniquely identify a particular integrity or other type of test. The test identifier can then be used to check any received test results. If the malware attempts to replay old results, the old results will not include the most recent test identifier and can be rejected. In the messages of FIGS. 7 and 8, the test identifier can be generated together with the random nonce, and can be generated on the SG side and stored in memory at the SG. Alternatively, the random nonce can be used as the test identifier and be generated at the SG or at another device. The test identifier can be used to generate the encrypted token or to generate the encrypted ticket or both. If it is used to generate the token, then the Cloud can also determine whether malware has generated a replay attack. If it is used for the ticket, then the SG can check the integrity of the pass/fail result to ensure that the encrypted ticket is not a replay.

The techniques described herein can be implemented using code and data stored and executed on one or more electronic devices (e.g., servers and clients). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touch screen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In addition, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a security gateway coupled between an HTTP (Hypertext Transfer Protocol) client and a web application installed on a server, the method comprising:
    receiving an HTTP response message from a web application server for delivery to an HTTP client, the response message including content;
    computing a digest based on the content of the HTTP response message;
    modifying the HTTP response message from the web application server to include code that when executed by a web browser on the HTTP client will cause the web browser to perform a test by computing a locally generated digest based on the HTTP response message it receives and return the locally generated digest to the security gateway;
    sending to the HTTP client the modified HTTP response message;
    receiving a test result message from the HTTP client, the test result message indicating the locally generated digest computed by the HTTP client wherein the digest and the locally generated digest will not match if malware has modified the content before reaching the web browser;
    analyzing the test result message for an indication of malware on the HTTP client; and
    taking defensive measures responsive to the analyzing.

2. The method of claim 1, further comprising establishing a session between the HTTP client and the web application server and wherein the taking defensive measures comprises marking the session as compromised.

3. The method of claim 1, further comprising receiving an HTTP request message, the HTTP request message being from the HTTP client and directed to the web application server and wherein the HTTP response message is in response to the HTTP request message.

4. The method of claim 3, further comprising transmitting the HTTP request to the web application server.

5. The method of claim 1, wherein the HTTP client includes a web browser and the computing the locally generated digest is performed by the web browser independent of any malware on the HTTP client.

6. The method of claim 1, wherein the taking defensive measures includes blocking messages from the HTTP client.

7. The method of claim 1, wherein the modified HTTP response message includes a test identifier to uniquely identify the test and wherein the code includes a command to return an indication of the test identifier.

8. The method of claim 7, wherein the test identifier includes an encrypted token generated using the computed digest and wherein the code includes a command to return the encrypted token.

9. The method of claim 1, wherein sending the modified HTTP response message includes sending a command to the HTTP client that when executed by a web browser on the HTTP client causes the web browser to perform the test operation with a remote server and to cause the remote server to forward the test results to the security gateway.

10. The method of claim 9, wherein the modified HTTP response message includes an indication of the digest, and wherein the sending a command includes sending a reference to the remote server and a command to send the indication of the digest to the remote server.

11. An apparatus comprising:
a network element including:
a security gateway module to receive an HTTP (Hypertext Transfer Protocol) response message from a web application server for delivery to an HTTP client, the response message including content;
wherein the security gateway module is further to perform a test with the HTTP client responsive to the received HTTP request message and a policy, wherein the performing includes:
computing a digest based on the content of the HTTP response message;
modifying the HTTP response message from the web application server to include code that when executed by a web browser on the HTTP client will cause the web browser to perform a test by computing a locally generated digest based on the HTTP response message it receives and return the locally generated digest to the security gateway;
sending to the HTTP client the modified HTTP response message; and
receiving a test result message from the HTTP client, the test result message indicating the locally generated digest computed by the HTTP client wherein the digest and the locally generated digest will not match if malware has modified the content before reaching the web browser;
wherein the security gateway module is further to analyze the test result for an indication of malware on the HTTP client; and
wherein the security gateway module is further to take defensive measures responsive to the analyzing.

12. The apparatus of claim 11, wherein the security gateway module is further to receive an HTTP request message, the HTTP request message being from an HTTP client and directed to a server on which a web application is installed and to determine whether the test is to be performed by detecting content in the request message that is commonly inserted by malware on an HTTP client.

13. The apparatus of claim 11, wherein the modified HTTP response further includes an encrypted token generated using the computed digest and wherein the code includes a command to return the encrypted token.

14. The apparatus of claim 11, wherein the HTTP client includes a web browser and the test operation is performed by the web browser independent of any malware on the HTTP client.

15. A non-transitory machine-readable medium storing instructions that, when executed by the machine, cause the machine to perform operations comprising:
receiving an HTTP response message from a web application server for delivery to an HTTP client, the response message including content;
computing a digest based on the content of the HTTP response message;
modifying the HTTP response message from the web application server to include code that when executed by a web browser on the HTTP client will cause the web browser to perform a test by computing a locally generated digest based on the HTTP response message it receives and return the locally generated digest to the security gateway;
sending to the HTTP client the modified HTTP response message;
receiving a test result message from the HTTP client, the test result message indicating the locally generated digest computed by the HTTP client wherein the digest and the locally generated digest will not match if malware has modified the content before reaching the web browser;
analyzing the test result message for an indication of malware on the HTTP client; and
taking defensive measures responsive to the analyzing.

16. The medium of claim 15, the instructions further comprising establishing a session between the HTTP client and the web application server and wherein the taking defensive measures comprises marking the session as compromised.

17. The medium of claim 16, wherein the taking defensive measures includes blocking messages from the HTTP client.

18. The medium of claim 15, wherein sending the modified HTTP response message includes sending a command to the HTTP client that when executed by a web browser on the HTTP client causes the web browser to perform the test operation with a remote server and to cause the remote server to forward the test results to the security gateway.

19. The medium of claim 18, wherein the modified HTTP response message includes an indication of the digest, and wherein the sending a command includes sending a reference to the remote server and a command to send the indication of the digest to the remote server.

* * * * *